United States Patent [19]

Schloman, Jr. et al.

[11] Patent Number: 4,786,683

[45] Date of Patent: Nov. 22, 1988

[54] PHENOLIC RESIN AND POLYETHER TREATED GUAYULE RESIN

[75] Inventors: William W. Schloman, Jr., Stow; James A. Davis, Uniontown, both of Ohio

[73] Assignee: The Firestone Tire & Rubber Company, Akron, Ohio

[21] Appl. No.: 54,465

[22] Filed: May 26, 1987

[51] Int. Cl.$^4$ ............................ C08G 8/10; C08F 8/00
[52] U.S. Cl. .................................. 525/54.42; 525/139
[58] Field of Search ..................... 525/54.42, 132, 133, 525/139, 141

[56] References Cited

U.S. PATENT DOCUMENTS

| | | |
|---|---|---|
| 2,701,895 | 2/1955 | Tawney et al. . |
| 2,713,572 | 7/1955 | Hall, Jr. . |
| 2,754,288 | 7/1956 | Banes et al. . |
| 3,607,792 | 9/1971 | Speranza et al. . |
| 3,639,928 | 2/1972 | Bentley et al. . |
| 3,730,908 | 5/1973 | Harvey . |
| 3,875,072 | 4/1975 | Waddill . |
| 3,887,756 | 6/1975 | Gerstin et al. ................ 428/425.3 |
| 4,127,514 | 11/1978 | Waddill .............................. 528/93 |
| 4,477,631 | 10/1984 | Danesi ............................... 525/133 |
| 4,542,191 | 9/1985 | Kay et al. ......................... 525/383 |
| 4,622,365 | 11/1986 | Schloman et al. ............. 525/332.5 |

OTHER PUBLICATIONS

Article-By R. W. Keller, et al., Rubber Chem. Technol., 1981 54(1), 115–123.

*Primary Examiner*—Christopher Henderson
*Attorney, Agent, or Firm*—Daniel N. Hall

[57] ABSTRACT

Guayule-type resins are chemically treated with a reactive phenolic resin and a polyether such as an amine terminated polyether. The treated guayule resin has improved physical properties such as higher softening points. The resulting composition is suitable as a rubber additive since it improves various physical properties such as building tack, tear strength, hysteresis loss, and the like.

10 Claims, No Drawings

4,786,683

PHENOLIC RESIN AND POLYETHER TREATED GUAYULE RESIN

This invention was made with Government support under No. 53-3142-7-6005 awarded by the Departments of Defense and Agriculture. The Government has certain rights in this invention.

FIELD OF THE INVENTION

The present invention relates to guayule resins which are chemically treated with a combination of a phenolic resin and a polyether. More specifically, the present invention relates to a chemical reaction of amine terminated polyethers and phenolic resins with guayule resins to produce a guayule resin having a high softening point and when used as rubber additives imparts improved physical properties thereto.

BACKGROUND

U.S. Pat. No. 2,701,895 to Tawney and Little relates to a method of vulcanizing butyl rubber by means of para-substituted phenol dialcohols.

U.S. Pat. No. 2,713,572 to Hall relates to a method of vulcanizing conjugated diolefin type elastomers in which a thiazyl sulfide is employed as a primary accelerator and in which certain conjugated polyoxypropylene-polyoxyethylene compounds are included in the elastomer as an activator for the thiazyl sulfide.

U.S. Pat. No. 2,754,288 to Banes and Nelson relates to a process for improving the quality of tackifying resins by the addition of cyclodiene monomers to raise the softening point.

U.S. Pat. No. 3,607,792 to Speranza and Waddill relates to polyoxypropylene polyamines as vulcanizing agents for halogen-containing polymers such as polyepichlorohydrin. The cured polymers are useful specialty rubbers which are resistent to ozone attack.

U.S. Pat. No. 3,639,928 to Bentley and Godfrey relates to a combination of compounds for accelerating the cure of a polyglycidyl ether of a polyhydric phenol cured with a polyoxyalkylene polyamine. The epoxy resin product is useful in castings, coatings, adhesives, laminates, and the like.

U.S. Pat. No. 3,730,908 to Harvey relates to mixtures of a polyglycol polyamine and an alkylene polyamine, which when added to polyepoxides provide compositions which are useful in coatings, castings, and the like.

U.S. Pat. No. 3,875,072 to Waddill relates to a combination of accelerators for accelerating the cure of a polyglycidyl ether of a polyhydric phenol cured with a polyoxyalkylene polyamine at ambient or elevated temperatures.

U.S. Pat. No. 3,887,756 to Gerstin and Spenadel relates to the use of reactive phenol-formaldehyde type resins to cure elastomer-based paints.

U.S. Pat. No. 4,127,514 to Waddill relates to a process for accelerating the cure of epoxy resins by mixing an epoxy resin of a polyhydric phenol, a polyglycidyl ether with an accelerator-hardener combination.

U.S. Pat. No. 4,542,191 to Kay and Gutierrez relates to tackifying agents for rubber comprising chemically treated guayule resin. Guayule resin is treated with a mixture of phenol and formaldehyde. The resin product is useful in promoting tack and green strength in unvulcanized rubber compositions.

U.S. Pat. No. 4,622,365 to Schloman and Davis relates to guayule-type resins which are chemically treated with an amine terminated polyether with the modified guayule resin and have improved physical properties when used as a rubber additive.

An article by Keller et al, Rubber Chem. Technol., 1981, 54(1), 115-123 relates to the use of guayule resin as a plasticizer in rubber compositions.

The above patents do not disclose the use of a reactive phenolic resin in combination with an amine terminated polyether to modify guayule resin as by increasing the softening point thereof or the use of such modified guayule resin to improve the properties of unvulcanized or vulcanized rubber compositions.

SUMMARY OF THE INVENTION

Accordingly, it is an aspect of the present invention to provide guayule resin chemically treated with a phenolic resin and an amine terminated polyether.

It is another aspect of the present invention to provide resinous phenolic and polyether derivatives, as above, which are useful as rubber additives.

It is a further aspect of the present invention to provide resinous phenolic and polyether derivatives, as above, which have higher softening points, increase the building tack and tear strength and reduce the hysteresis loss of vulcanized rubber compositions.

It is still another aspect of the present invention to provide resinous phenolic and polyether derivatives, as above, which activate the cure of sulphur-vulcanized rubber compositions.

These and other aspects of the present invention will apparent from the following detailed Specification.

In general, a composition of matter, comprising a guayule or a guayule like resin chemically treated with an effective amount of a phenolic resin and an amine terminated polyether.

DETAILED DESCRIPTION OF THE INVENTION

According to the present invention, guayule or guayule-like resins are chemically treated with phenolic resins such as halomethyl- or hydroxymethyl-containing phenol-formaldehyde resins and polyethers such as amine terminated polyethers to form derivatives which are at least useful in various rubber compositions.

Plant materials that can be utilized as sources of guayule resins and guayule-like or guayule type resins include a large number of plant species bearing rubber and rubber-like hydrocarbons. These include guayule, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia gradniflora*), milkweeds (*Asclepias syriaca, speciosa, subulata,* et al), goldenrods (*Solidago altissima, graminifolia, rigida,* et al), pale Indian plantain (*Cacalia atriplicifolia*), Russian dandelion (*Taraxacum kok-saghyz*), mountain mint (*Pycnanthemum incanum*), American germander (*Teucreum canadense*) and tall bellflower (*Campanula americana*). Many other plants which produce rubber and rubber-like hydrocarbons are also known, particularly among the Asteraceae (Compositae), Euphorbiaceae, Campanulaceae, Labiatae, and Moraceae families and the same can also be utilized.

Guayule resin prepared from such plants is generally extracted with an organic polar solvent. Such polar solvents include alcohols having from 1 to 8 carbon atoms, for example methanol, ethanol, isopropanol, and the like; esters having from 3 to 8 carbon atoms such as the various formates, the various acetates, and the like; and ketones having from 3 to 8 carbon atoms, such as acetone, methyl ethyl ketone, and the like. The preferred extraction solvent is acetone or ethyl alcohol. The resin generally constitutes about 6 to about 15 percent of the dry weight of the plant. The resin can be obtained by any conventional extraction method such as solvent extraction of the whole shrub, including the leaves, the woody tissue, and the like. Generally a suitable crush or grinding step is initially utilized, for example, a hammermill. The organic polar solvent can then be added to the crushed guayule plant material to extract the resin therefrom. Naturally, other common or conventional resin extraction methods can be utilized.

The extracted guayule resin contains a wide variety of components with the most abundant constituents being triterpene ketoalcohols (see Rodriquez-Hahn et al, Rev. Latinoamer. Quim., 1970, 1(1), 24–28. Another constituent are the diterpene ketoalcohols (see Dorado Bernal et at., Chim. Ind. (Paris), 1962, 87(5), 612–620). Other constituents include polyphenolics and free acids (see Buchanan et al., J. Am. Oil Chem. Soc., 1978, 55(9), 657–662).

Once the guayule resin has been extracted, desirably it is physically processed as by vacuum or steam devolatization or extraction with a hydrocarbon solvent such as hexane, or the like. Devolatilization removes low boiling oils which often cause undesirable odors and excessive softening when present. Suitable hydrocarbons include the alkanes having from 4 to about 9 carbon atoms such as heptane, the cycloalkanes having from about 5 to about 10 carbon atoms such as cyclohexane, and the like. The hydrocarbon extraction step allows separation of the less-soluble polar compounds which are removed as an insoluble residue. The hydrocarbon insoluble portion of the resin is recovered for chemical treatment with the polyethers and the phenolics of the present invention. Combinations of various physical treatments can also be utilized.

According to he concepts of the present invention, the above extracted guayule resin is treated by chemical reaction with a phenolic crosslinking agent and an amine terminated polyether. That is, both the phenolic resin and the amine-terminated polyether are utilized. Generally, any active phenolic-type resin can be utilized which will react with the hydrocarbon insoluble guayule resin portion. Typically, the phenolic resins act as a crosslinking agent. Some of the phenolic resins can be represented by the formula

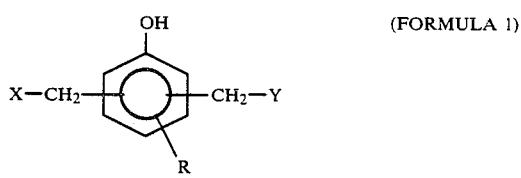

(FORMULA 1)

where X and Y independently can be the same or different and are hydroxyl, bromine, iodine or chlorine, with hydroxyl and bromine being preferred, and where R is selected from the hydroxymethyl, bromomethyl, iodomethyl, chloromethyl, an alkyl having 1 to 25 and preferably from 1 to 18 carbon atoms, or an alkenyl having from 3 to 25 and preferably from 3 to 18 carbons. R is preferably an alkyl group.

A specific example is such a reactive phenolic is 2,6-bis(hydroxymethyl)-p-cresol (X+Y=OH, R=CH$_3$) produced by the Sherwin-Williams Co. Other types of reactive phenolic crosslinking agents suitable for use in the present invention include resins represented by the formula

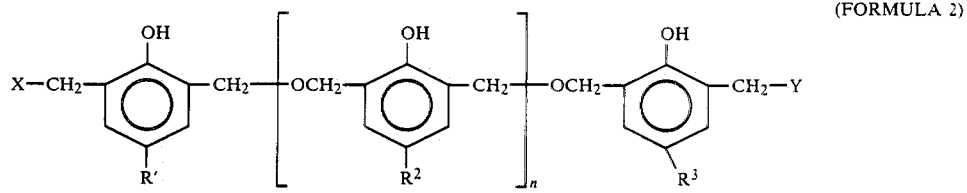

(FORMULA 2)

where X and Y are the same as in Formula 1, and hence independently can be the same or different, where R', through R$^3$ independently can be the same or different and are hydroxymethyl, bromomethyl, iodomethyl, chloromethyl, and alkyl having from 1 to 25 and preferably from 1 to 18 carbon atoms, or an alkenyl having from 3 to 25 and preferably from 3 to 18 carbon atoms, and n is a number averaging between 0 and 2. R', R$^2$, and/or R$^3$ independently is preferably an alkyl group. Specific examples of such resins include Varcum 29-407 (X+Y=OH, R=alkyl) produced by Reichhold Chemicals, Inc., and SP-1045 (X+Y=OH, R=alkyl) and SP-1055 (X=Br, Y=OH (X/Y=0.9), R=alkyl) produced by Schenectady Chemicals, Inc.

Considering the amine terminated polyethers, some of them can be represented by the formula

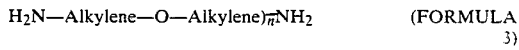

(FORMULA 3)

wherein n is an integer from about 2 to about 100, desirably from about 2 to about 70 and preferably from about 2 to about 5, and wherein each "Alkylene", independently, has from 2 to about 10 carbon atoms with 2 carbon atoms, that is ethylene, or 3 carbon atoms, that is propylene, being preferred. The "Alkylene" group can be branched or straight. Specific examples of such amine terminated polyethers include the Jeffamine D-Series produced by the Texaco Chemical Co. and have the formula

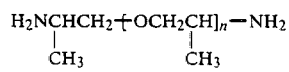

The various type of available Jeffamine D-Series products include the following:

| Product | n | Approx. Mol. Wt. |
| --- | --- | --- |
| Jeffamine D-230 | 2–3 | 230 |
| Jeffamine D-400 | 5–6 | 400 |
| Jeffamine D-2000 | 33 | 2000 |
| Jeffamine D-4000 | 68 | 4000 |

Other types of amine terminated polyethers suitable for use in the present invention are represented by the formula

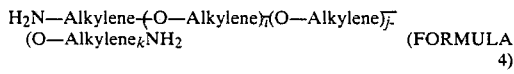
(FORMULA 4)

wherein each "Alkylene", independently, is as set forth above, and wherein i plus k is an integer of from about 2 to 25, desirably from about 2 to about 10 and preferably from about 2 to about 5. The number of repeating units represented by j is an integer of from about 1 to about 200, desirably from about 2 to about 150 and preferably from about 2 to about 10. Examples of such suitable polyethers include the Jeffamine ED-Series produced by the Texaco Chemical Co. and have the formula

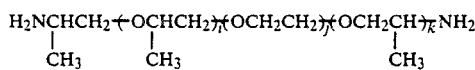

Examples of such specific Jeffamine ED-Series polymers include the following:

| Product | j | i + k | Approx. Mol. Wt. |
|---|---|---|---|
| Jeffamine ED-600 | 8.5 | 2.5 | 600 |
| Jeffamine ED-900 | 15.5 | 2.5 | 900 |
| Jeffamine ED-2001 | 40.5 | 2.5 | 900 |
| Jeffamine ED-2001 | 86.0 | 2.5 | 2000 |
| Jeffamine ED-4000 | 86.0 | 2.5 | 4000 |
| Jeffamine ED-6000 | 131.5 | 2.5 | 6000 |

Still another type of suitable amine terminated polyethers which can be utilized in the present invention are those generally represented by the formula

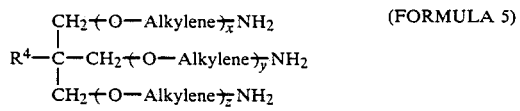
(FORMULA 5)

wherein each "Alkylene", independently, is as set forth above, that is, has from 2 to about 10 carbon atoms therein with 2 or 3 carbon atoms being preferred. The total number of x+y+z integers is from about 2 to about 100, desirably from about 2 to about 10 and preferably from about 5 to about 10. $R^4$ is hydrogen or an aliphatic group with a desirably aliphatic group being an alkyl. When $R^4$ is an alkyl it has from about 1 to about 5 carbon atoms with 1 or 2 carbon atoms being preferred. Examples of such suitable polyethers include the Jeffamine T-Series produced by the Texaco Chemical Company and have the formula

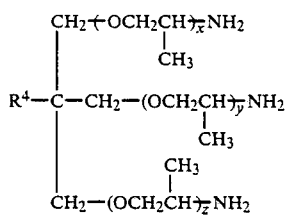

Examples of such specific Jeffamine T-Series include the following:

| Product | Approx. Value x + y + z | Approx. Mol. Wt. |
|---|---|---|
| Jeffamine T-403 | 5–6 | 440 |
| Jeffamine T-3000 | 50 | 3000 |
| Jeffamine T-5000 | 85 | 5000 |

The chemical reaction of the phenolic resin or crosslinking agent with guayule resin proceeds by condensation of the halomethyl or hydroxymethyl groups with the various guayule resin components such as polyphenolics to produce crosslinked polyphenolics with hydrogen bromide, hydrogen chloride, or water being formed as by-products. The chemical reaction of the amine terminated polyether with guayule resin proceeds by condensation of the amine groups with the various guayule resin components such as triterpene ketoalcohol and free acid to produce ketimine, enamine, and amide derivatives with water being formed as a by-product.

It is known that various resins in order to be suitable for use in various rubber compositions should have a ring-and-ball softening point above 75° C. as measured by ASTM method E28-67. For example, U.S. Pat. No. 3,880,593 to Downey teaches that tackifying resins have ring-and-ball softening points more preferably from about 80° C. to about 130° C. It is often found that crosslinking agents such as reactive cyclodiene monomers are incorporated into resins to increase softening point. Unexpectedly, it has been found that phenolic-modified guayule resin derivatives have high softening points while imparting favorable properties to various rubber compositions. The phenolic resin and amine terminated polyether modified guayule resins or guayule-like resins of the present invention have ring-and-ball softening points of at least 75° C., desirably at least 80° C., and preferably at least 90° C.

The phenolic and amine terminated polyether modified guayule resin of this invention can be prepared using either a two-step method or a one-step method. In the one-step method, guayule resin is first reacted with an amine terminated polyether or combination of amine terminated polyethers. The polyether treated guayule resin is subsequently modified by reaction with a phenolic crosslinking agent. In the one-step method, guayule resin is reacted simultaneously with an amine terminated polyether, or combination of amine terminated polyethers, and a phenolic crosslinking agent.

The first step of the two-step method can be carried out by treating a hydrocarbon solvent solution of guayule resin in the presence of an amine terminated polyether or a combination of amine terminated polyethers at a temperature of from about 65°–200° C. and preferably from about 65°–130° C. The reaction desirably is carried out at approximately atmospheric pressure. Preferred solvents include benzene, toluene, and xylene. The reaction mixture must be maintained at a temperature sufficient to remove the by-product water. Desirably, the temperature is such that the water is removed by azeotropic distillation. The reaction mixture can be agitated by mechanical means or by the use of a nitrogen sparge. A nitrogen sparge also serves to remove solvent and volatile by-products at the conslusion of the reaction. Alternatively, the reaction may be carried out under vacuum by treating guayule resin with an amine-terminated polyether or a combination of amine-terminated polyethers in the absence of solvent. Such reaction may be carried out at pressures of from 0.05 to 30.0 MPa, preferably from 3.0 to 15.0 MPa, and temperatures of from 65°–200° C., preferably from 150°–200° C.

The proportions by weight of reactants are in the range of from about 1–50 parts by weight of amine terminated polyether, preferably 10–50 parts by weight of amine terminated polyether to 100 parts by weight of guayule resin. Higher softening points can be obtained by using the guayule resin polar fraction rather than the unfractionated guayule resin. Higher softening points can be obtained by means of a steam sparge treatment of the resinous reaction product, wherein the steam is at a temperature of between 150°–325° C. and preferably between 200°–250° C. The steam sparge is continued until about 20–200 parts of distillate is obtained for every part of residual resin. The distillate, in addition to containing condensed steam, is composed of low molecular weight reaction by-products and possibly unreacted guayule resin components. About 2–50 parts of volatile by-products are removed for every 100 parts of resinous product. Preferably, 2–15 parts of volatile by-products are removed for every 100 parts of resinous product.

The second step of the two-step method can be carried out be treating a hydrocarbon solution of polyether-treated guayule resin the the presence of a phenolic crosslinking agent at a temperature of about 65°–200° C., preferably about 100°–190° C. The reaction desirably is carried out as in the first step, above. Alternatively, the reaction may be carried out under vacuum in the absence of solvent as in the first step, above. Low molecular weight reaction by-products can be removed by means of a steam sparge treatment as in the first step, above. The proportions by weight of reactants are in the range of from about 1–50 parts by weight of phenolic crosslinking agent, preferably about 5–25 parts by weight per 100 parts by weight of polyether-treated guayule resin. Various amounts of conventional or common crosslinking promoters can be added either alone or in combination to promote the crosslinking reaction of the phenolic component. Accordingly, amines such as hexamethylenetetramine can be utilized. Various metal oxides such as zinc oxide can be utilized. Additionally, various metal halides such as zinc chloride, stannous chloride, and the like can also be utilized.

The one-step method can be carried out by treating a hydrocarbon solution of guayule resin the the presence of an amine terminated polyether or mixture of amine terminated polyethers and a phenolic crosslinking agent at a temperature of about 65°–200° C., preferably about 100°–190° C. The reaction desirably is carried out as in the first step, above. Desirably, the reaction is carried out in the absence of solvent at atmospheric pressure. A nitrogen sparge can be utilized to remove water, low molecular weight reaction by-products, and possibly unreacted guayule resin components. Alternatively, the reaction may be carried out under vacuum in the absence of solvent, as in the first step above. Volatile by-products can be further removed by means of a steam sparge treatment of the resinous reaction product, as in the first step of the two-step method, above. About 2–50 parts of volatile by-products are removed for every 100 parts of resinous product. Preferably, 2–20 parts of volatile by-products are removed for every 100 parts of resinous product. The proportions by weight of reactants are the same as in the two-step method. That is, from about 1–50 parts by weight of amine terminated polyether, preferably about 10–50 parts by weight of amine terminated polyether, and from about 1–50 parts by weight of phenolic crosslinking agent, preferably about 5–25 parts by weight of phenolic resin crosslinking agent, per 100 parts of guayule resin. As in the second step of the two-step method, various amounts of crosslinking promoters can be added to promote the formation of resinous product.

The phenolic and amine terminated polyether modified guayule resin of this invention is desired in that it has high softening points and hence tends to prevent a glomeration of the resin. The modified guayule resin can also be added to various rubber formulations to impart various favorable properties such as building tack, green strength, cure activation, tear strength, and to reduce dynamic heat loss, that is hysteresis loss.

In general, low amounts of phenolic and amine terminated polyether modified guayule resin, that is less than 5 parts per 100 parts of rubber impart reduced hysteresis loss. Progressively higher amounts of phenolic and amine terminated polyether modified guayule resin, that is 2 parts or more per 100 parts or rubber impart shorter scorch time, shorter cure time, and higher cure rate indices. The amount of phenolic and amine terminated polyether modified guayule resin used per 100 parts by weight of rubber is generally from about 0.1–20 parts by weight, desirably from about 0.1–10.0 parts by weight and preferably from about 0.5–5.0 parts by weight.

Generally, any conventional type of rubber compound or formulation can be utilized as well know to the art. Examples of suitable types of rubber include natural rubber, rubber made from diene monomers having from 4 to 12 carbon atoms, including isoprene, butadiene, and the like; rubbers made from interpolymers of diene monomers have from 4 to 12 carbon atoms such as isoprene and butadiene, and the like; rubber copolymers made from diene monomers having from 4 to 12 carbon atoms with other copolymerizable monomers as for example, vinyl substituted aromatics having from 8 to 12 carbon atoms, i.e. styrene, alpha-methyl-styrene; or other monomers such as acrylic ester, methyl isopropenyl ketone, isobutylene, acrylonitrile or an unsaturated carboxylic acid; halogenated rubber such as polychloroprene, chlorosulfonated polyethylene, or fluororubbers; terpolymers of one or more monoolefins with a monomer which confers unsaturation on the interpolymer, for example the various types of EPDM terpolymers, butyl rubbers, halobutyl rubbers, norbornene rubbers, polusulfide rubbers, sulfur vulcanizable polyurethane rubber; and blends thereof. Additionally, blends of the above rubbers containing a minor portion of SBS or SIS (styrene and butadiene or isoprene) copolymers can also be used. Additionally, one or more of the above synthetic rubbers can be blended with the various amounts of natural rubber as by example from about 10% to about 95% of natural rubber.

Various amounts of conventional or common rubber additives can be added to the rubber in conventional amounts as well known to the art or as set forth in the Vanderbilt Rubber Handbook, copyright 1978. Thus, various fillers and reinforcing agents such as carbon black or silica can be utilized. Additionally, various processing oils such as aromatic, paraffinic or haphthenic types can be utilized. Other common additives are metal salts such as zinc oxide and the like. Fatty acids can also be utilized such as stearic acid. Still other additives include accelerators such as the various sulfenamide and various antioxidants such as hindered phenols and substituted p-phenylenediamines.

Accordingly, the phenolic and amine terminated polyether modified guayule resins of the present invention can be utilized wherever the above properties are desired such as in tires, including passenger tires, truck tires and off-the-road tires, conveyor belts, power and transmission belts, fuel or chemical tank linings, thermal insulation, flotation gear, automotive floor mats, mud flaps, rubber tiles, motor mounts, draft gear pads, gaskets, seals, O-rings, bumpers, roofing membranes, tank track pads, shock absorbers, and other mechanical rubber goods.

Two specific uses of the phenolic and amine terminated polyether modified guayule resin are as green strength promoters and tackifiers for rubber compositions. Green strength is a measure of the ability of the unvulcanized rubber to resist deformation. Tack, or more specifically building tack, is a measure of the ability of two unvulcanized rubbers to stick together during fabrication. Green strength and building tack are significant properties in handling unvulcanized materials. It is often desirable that such agents are preferably added to natural and synthetic rubbers to increase inherent green strength and tack or correct any deficiencies in green strength and tack properties.

Another property of the phenolic and amine terminated polyether modified guayule resin of the present invention is that it unexpectedly yields a large improvement in activating the cure of sulfur-vulcanized rubber compositions. Cure activation is effected by reducing the time to the onset of vulcanization, the scorch time ($t_s2$), or the time to optimum cure, that is the cure time ($t'_c90$), or both. The cure activation is commonly measured by the cure rate index which is defined as the number 100 divided by the quantity $t'_c90$ minus $t_s2$. Thus, the phenolic and amine terminated polyether guayule resin is desirably added to natural and synthetic rubber compositions to activate cure, decrease scorch time, and to increase the cure rate index.

Another property of the phenolic and amine terminated polyether modified guayule resin is that it increases the tear strength of vulcanized rubber compositions. Tear strength is the force necessary to propagate a crack or tear under stress. It is often found that reinforcing agents are preferably added to natural and synthetic rubbers to increase tear strength.

An important property of a phenolic and amine terminated polyether modified guayule resin of the present invention is that is dramatically reduces the dynamic heat loss, that is the hysteresis loss, in vulcanized rubber compositions. Hysteresis loss is defined as the ratio of the loss modulus to the storage modulus of a rubber composition and is a measure of the energy dissipated during deformation or flexing in tires such as passenger and truck tires. Decreased hysteresis loss in the rubber compositions also contributes to abating rolling resistance.

The examples given below illustrate both the preparation and use of phenolic and amine terminated modified guayule resin products in a typical rubber recipe. Table I lists recipe ingredients. These rubber compositions can also contain other conventional additives for rubber such as fillers, accelerators, stabilizers, pigments, and the like. As a control or comparative example, a commercial polyterpene resin sold by Hercules, Incorporated under the name "Piccopale 100" was used.

The green strength, the building tack, the cure characteristics, the tear strength, and the hysteresis properties were determined in the following manner:

Green strength properties of the unvulcanized compounded stocks were determined using an Instron Model TTD tester. Green strength values are reported as both initial and peak values to more completely describe the stress-strain properties of uncured stocks. Higher values are, of course, desirable. Building tack properties were also determined on the Instron Tester. Test pieces were nylon fabric-backed plaques which had been pressed together 15 min. at 93° C. before measurement. Table II illustrates the improvements in tack and green strength obtained with the products of Examples 3 through 5.

Cure characteristics of the compounded stocks were determined by means of a Monsanto oscillating disc curemeter (ASTM Method D2084-81). The cure data summarized in Table III show that the products of Examples 3 through 5 decreased both scorch time and cure time, and increased the cure rate index. This behavior, typical of cure activators, was not obtained with the polyterpene resin and with the product of Example 2.

Tear strength properties of the cured compounded stocks were determined in accordance with ASTM method D624-81 on specimens cut with die B. Table IV shows that the products of Examples 2 through 5 imparted improved tear strength.

Dynamic properties of the cured compounded stocks were evaluated as the hysteresis loss factor. This was determined at 23° C. using the well-known MTS Model 830 elastomer test system. Table V illustrates that the phenolic and amine terminated polyether guayule polyether-crosslinked resin products of Examples 3 through 5 decrease hysteresis loss when added at less than 5 parts per 100 parts of rubber.

The following examples illustrate the preparation of the various phenolic-modified guayule resins used to generate the data in the Tables.

EXAMPLE 1

A mixture of 300 parts of guayule resin polar fraction and 48.5 parts of Jeffamine D-230 heated to 165°–170° C. The pressure in the reactor was reduced to about 3–10 MPa by means of a vacuum pump to facilitate distillation of 10 parts of volatile by-products. The reactor pressure was returned to atmospheric and the reaction mixture treated with a steam sparge at 210°–225° C. to distill an additional 16 parts of volatile by-products. The total steam distillate yield was about 94 parts. In this manner was obtained 322 parts of a brown resinous product having a ring-and-ball softening point of 71° C.

EXAMPLE 2

A mixture of 100 parts of guayule resin polar fraction, 10 parts of 2,6-bis(hydroxymethyl)-p-cresol, and 3 parts of zinc oxide was heated to about 150°–155° C. The pressure in the reactor was reduced to about 0.5–3 MPa by means of a vacuum pump to facilitate distillation of 5 parts of volatile by-products. The reactor pressure was returned to atmospheric and the product decanted to yield 108 parts of a brown resinous product with a ring-and-ball softening point of 84° C.

EXAMPLE 3

A mixture of 100 parts of the resinous product of Example 1 and 5 parts of Varcum 29-407 was heated to about 150°–160° C. The pressure in the reactor was reduced to about 3–7 MPa by means of a vacuum pump to facilitate distillation of 1 part of volatile by-products. The reactor pressure was returned to atmospheric and the product decanted to yield 104 parts of a brown resinous product with a ring-and-ball softening point of 81° C.

EXAMPLE 4

In a reactor equipped with a mechanical stirrer and gas inlet tube, 100 parts of guayule resin polar fraction, 16.2 parts of Jerramine D-230, and 11.4 parts of Varcum 29-407 were fused at 110° C. The temperature was raised to 155°–170° C. until 3 parts of volatile by-products had been removed with a nitrogen sparge. This was followed by a steam sparge at about 200°–225° C. to distill 7 parts of volatile by-products. The total distillate yield was about 82 parts. In this manner was obtained 117 parts of a brown resinous product with a ring-and-ball softening point of 77° C.

EXAMPLE 5

Following the procedure in Example 4, 100 parts of guayule resin polar fraction, 16.2 parts of Jeffamine D-230, 11.4 parts of 2,6-bis(hydroxymethyl)-p-cresol, and 3.4 parts of zinc oxide were heated at 175° C. to 190° C. unitl 7 parts of volatile by-products had been removed with a nitrogen sparge. An additional 4 parts of volatile by-products were removed by means of a steam sparge at about 200° C. to 225° C. The total distillate yield was abosut 29 parts. In this manner was obtained 120 parts of a brown resinous product with a ring-and-ball softening point of 91° C.

TABLE I

| RUBBER TEST RECIPE | |
|---|---|
| INGREDIENTS | PARTS BY WEIGHT |
| 1. NR | 50 |
| 2. SBR | 50 |
| 3. HAF Carbon Black | 50 |
| 4. Medium aromatic process oil | 3 |
| 5. Zinc oxide | 3 |
| 6. Stearic acid | 2 |
| 7. Antioxidant (substituted p-phenylenediamine) | 1 |
| 8. Sulfenamide accelerator | 1 |
| 9. Sulfur | 2 |
| 10. Modified guayule resin | Variable |

TABLE II

TACKIFYING PROPERTIES AND GREEN STRENGTH DATA

| Resin Example No. | Level, phr | Building Tack, kN/m | Green Strength, MPa Initial | Peak |
|---|---|---|---|---|
| Control | 0 | 2.23 | 0.28 | 0.75 |
| Polyterpene Resin | 1 | 2.36 | 0.28 | 0.90 |
| | 6 | — | 0.28 | 1.19 |
| 1 | 1 | 1.95 | 0.48 | 1.56 |
| 1 | 5 | 2.01 | 0.48 | 1.46 |
| 2 | 1 | 2.09 | 0.25 | 0.63 |
| 2 | 5 | 3.09 | 0.31 | 0.58 |
| 3 | 1 | 2.54 | 0.34 | 1.32 |
| 3 | 2 | 2.28 | 0.34 | 1.32 |
| 3 | 5 | 2.71 | 0.34 | 1.22 |
| 4 | 1 | 2.58 | 0.34 | 1.41 |
| 4 | 2 | 2.80 | 0.34 | 1.07 |
| 4 | 5 | 2.36 | 0.38 | 1.23 |
| 5 | 1 | 2.54 | 0.34 | 0.98 |
| 5 | 2 | 2.93 | 0.38 | 1.38 |
| 5 | 5 | 2.45 | 0.34 | 1.05 |

TABLE III

CURE DATA, 150° C.

| Resin Example No. | Level, phr | $t_s2$, min | $t'_c90$, min | CRI | $M_H$ dN.m |
|---|---|---|---|---|---|
| Control | 0 | 9.6 | 16.3 | 14.9 | 36.0 |
| Polyterpene Resin | 1 | 9.2 | 14.8 | 17.8 | 42.0 |
| | 6 | 9.8 | 16.4 | 15.1 | 41.7 |
| 1 | 1 | 7.6 | 13.9 | 15.9 | 46.4 |
| 1 | 5 | 4.6 | 8.5 | 25.6 | 44.4 |
| 2 | 1 | 10.1 | 17.4 | 13.2 | 35.2 |
| 2 | 5 | 10.8 | 17.8 | 14.2 | 32.9 |
| 3 | 1 | 7.8 | 13.2 | 18.5 | 46.4 |
| 3 | 2 | 6.9 | 11.7 | 20.8 | 46.0 |
| 3 | 5 | 5.4 | 9.1 | 27.0 | 43.0 |
| 4 | 1 | 7.9 | 13.6 | 17.5 | 45.2 |
| 4 | 2 | 7.2 | 12.3 | 19.6 | 43.5 |
| 4 | 5 | 5.3 | 9.4 | 24.4 | 43.7 |
| 5 | 1 | 7.2 | 12.3 | 19.6 | 46.0 |
| 5 | 2 | 6.7 | 11.8 | 19.6 | 45.6 |
| 5 | 5 | 5.0 | 9.1 | 24.4 | 44.0 |

TABLE IV

TEAR PROPERTIES DATA*

| Resin Example No. | Level, phr | Tear Strength, kN/m |
|---|---|---|
| Control | 0 | 49.6 |
| Polyterpene Resin | 1 | 52.2 |
| | 6 | 58.3 |
| 1 | 1 | 49.8 |
| 1 | 5 | 47.9 |
| 2 | 1 | 59.5 |
| 2 | 5 | 66.9 |
| 3 | 1 | 52.8 |
| 3 | 2 | 48.6 |
| 3 | 5 | 65.4 |
| 4 | 1 | 62.8 |
| 4 | 2 | 54.5 |
| 4 | 5 | 66.8 |
| 5 | 1 | 62.0 |
| 5 | 2 | 64.4 |
| 5 | 5 | 50.0 |

*Stocks cured 30 min at 150° C.

TABLE V

DYNAMIC PROPERTIES DATA*

| Resin Example No. | Level, phr | Hysteresis Loss Factor |
|---|---|---|
| Control | 0 | 0.181 |
| Polyterpene Resin | 1 | 0.174 |
| | 6 | 0.185 |
| 1 | 1 | 0.160 |
| 1 | 5 | 0.196 |
| 2 | 1 | 0.192 |
| 2 | 5 | 0.240 |
| 3 | 1 | 0.169 |
| 3 | 2 | 0.177 |
| 3 | 5 | 0.190 |
| 4 | 1 | 0.163 |
| 4 | 2 | 0.167 |
| 4 | 5 | 0.192 |
| 5 | 1 | 0.157 |
| 5 | 2 | 0.161 |
| 5 | 5 | 0.185 |

*Stocks cured 30 min at 150° C.

As apparent from the above Tables, the data clearly reveals that the combination of a phenolic resin and an amine terminated polyether generally has good initial green strength as well as MPa peak green strength. The guayule resins of the present invention also generally retain the good cure of activation of the amine terminated polyether whereas the good tear strength of the phenolic resin is retained. As a whole, combination of the phenolic resin and the amine terminated polymer generally yields improved results. As is further apparent from the Tables, much better properties are obtained than those derived from the use of the polyterpene resin or the control.

While in accordance with the patent statutes, a best mode and preferred embodiment have been set forth, it is to be understood that numerous variations, permutations, and combinations can be made within the teaching of the present invention and accordingly the scope of the present invention is set forth by the scope of the attached claims.

What is claimed is:

1. A composition of matter, comprising:
a guayule or a guayule like resin chemically treated with an effective amount of a phenolic crosslinking agent and an amine terminated polyether so that the softening point of said resin is at least 75° C. according to ASTM Method E28-67, said phenolic crosslinking agent having the formula

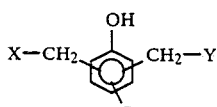 (FORMULA 1)

or

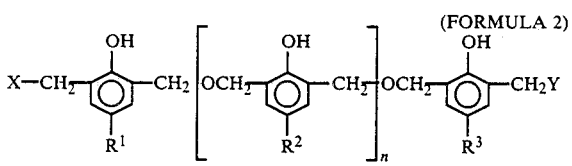 (FORMULA 2)

or combinations thereof, wherein X and Y independently is hydroxyl, bromine, iodine, or chlorine, wherein R is hydroxymethyl, bromomethyl, iodomethyl, chloromethyl, an alkyl having from 1 to 25 carbon atoms, or an alkenyl having from 3 to 25 carbon atoms, and wherein $R^1$, $R^2$, and $R^3$, independently is hydroxymethyl, bromomethyl, iodomethyl, chloromethyl, an alkyl having from 1 to 25 carbon atoms, or an alkenyl having from 3 to 25 carbon atoms, and wherein n is from 0 to 2.

2. A composition according to claim 1, including initially reacting said amine terminated polyether with said guayule crosslinking agent as subsequently reacting said phenolic resin with said amine terminated polyether reacted guayule or said guayule like resin.

3. A composition according to claim 1, wherein the amount of said phenolic crosslinking agent is from about 1 part to about 50 parts by weight based upon 100 parts by weight of said guayule or said guayule like resin, wherein said amine terminated polyether has the formula

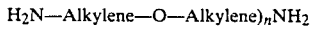 (FORMULA 3)

or

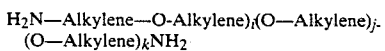 (FORMULA 4)

or

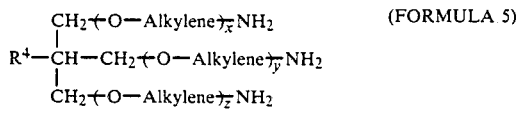 (FORMULA 5)

or combinations thereof, wherein each said alkylene, independently has from 2 to about 10 carbon atoms, wherein said n of Formula 3 is an integer of from about 2 to about 100, wherein i+k is an integer of from about 2 to about 25, wherein said j is an integer of from about 1 to about 200, wherein x+y+z is an integer of from about 2 to about 100, wherein $R^4$ is hydrogen or an aliphatic group having from 1 to 5 carbon atoms, and wherein the amount of said amine terminated polyether is from about 1 to about 50 parts by weight based upon 100 parts by weight of said guayule or said guayule like resin.

4. A composition according to claim 3, wherein said chemically treated guayule resin has a softening point of at least 80° C. according to ASTM method E-28-67.

5. A composition according to claim 4, wherein n of Formula 3 is from about 2 to about 70, wherein i+k is from about 2 to about 10, wherein j is from about 2 to about 150, wherein x+y+z is from about 2 to about 10, and wherein $R^4$ is an alkyl having from 1 to about 5 carbon atoms.

6. A composition according to claim 5, wherein said chemically treated guayule or guayule like resin has a softening point of at least 90° C., wherein said guayule resin is an insoluble hydrocarbon portion thereof, wherein X and Y of said phenolic crosslinking agent independently is hydroxyl or bromine, wherein $R^1$, $R^2$, or $R^3$, of said phenolic crosslinking agent independently is an alkyl having resin from 1 to 18 carbon atoms, wherein each said alkylene of said amine terminated polyether (Formulas 3, 4, and 5), independently, has 2 or 3 carbon atoms, wherein n in Formula 3 is from about 2 to about 5, wherein i+k is from about 2 to about 5, wherein j is from about 2 to about 10, wherein x+y+z is from about 5 to about 10, and wherein $R^4$ is an alkyl having 1 or 2 carbon atoms.

7. A composition according to claim 6, wherein the amount of phenolic crosslinking agent is from about 5 parts to about 25 parts by weight based upon 100 parts by weight of said guayule or said guayule like resin, wherein the amount of said amine terminated polyether is from about 10 to about 50 parts by weight based upon 100 parts by weight of said guayule or said guayule like resin.

8. A composition according to claim 1, including substantially reacting said phenolic crosslinking agent and said amine terminated polyether simultaneously with said guayule or said guayule like resin.

9. A composition according to claim 6, including substantially reacting said phenolic crosslinking agent and said amine terminated polyether simultaneously with said guayule or said guayule like resin.

10. A composition according to claim 7, including initially reacting said amine terminated polyether with said guayule or said guayule like resin as subsequently reacting said phenolic crosslinking agent with said amine terminated polyether reacted guayule or guayule like resin.

* * * * *

UNITED STATES PATENT AND TRADEMARK OFFICE
CERTIFICATE OF CORRECTION

PATENT NO. : 4,786,683

DATED : November 22, 1988

INVENTOR(S) : William W. Schloman, Jr. and James A. Davis

It is certified that error appears in the above-identified patent and that said Letters Patent is hereby corrected as shown below:

Column 4, line 9, "example is" should read --example of--.

Column 5, Formula 4, that portion of the formula reading: "(O—Alkylene $_k$NH$_2$" should read -- (O—Alkylene$)_k$NH$_2$ --

Column 6, line 66, "conslusion" should read --conclusion--.

Column 7, line 56, add the word --other-- before "low".

Column 8, line 50, "polusulfide" should read --polysulfide-- line 64, "haph-" should read --naph--.

Column 11, line 12, "Jerramine" should read --Jeffamine--; line 27, "unitl" should read --until--; line 31, "abosut" to --about--.

Claim 1, column 3 (Formula 2) that portion of the formula reading: "CH$_2$Y" should read --CH$_2$—Y--

Claim 2, line 48 of column 13, delete the words "cross-linking agent as" and substitute therefor --resin and--; line 49 by deleting the word "resin" and substitute therefor --cross-linking agent--.

UNITED STATES PATENT AND TRADEMARK OFFICE
CERTIFICATE OF CORRECTION

PATENT NO. : 4,786,683
DATED : November 22, 1988
INVENTOR(S) : William W. Schloman, Jr. and James A. Davis It is certified that error appears in the above-identified patent and that said Letters Patent is hereby corrected as shown below:

Claim 3, lines 57 through 64 of column 13, Formulae 3 and 4, should be shown as follows:

(FORMULA 3)

or

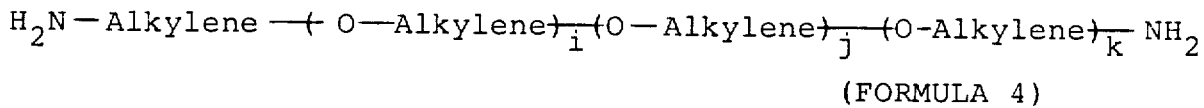
(FORMULA 4)

Claim 6, column 14, line 36, delete the word "resin".
Claim 10, column 14, line 62, "as subsequently" should read --and subsequently--.

Signed and Sealed this

Eighteenth Day of July, 1989

Attest:

DONALD J. QUIGG

Attesting Officer

Commissioner of Patents and Trademarks